(12) United States Patent
Lin

(10) Patent No.: US 7,484,843 B1
(45) Date of Patent: Feb. 3, 2009

(54) EYEGLASS NOSE BRIDGE STRUCTURE

(75) Inventor: Chien-Mei Lin, Taipei (TW)

(73) Assignee: T-Link PPE Ltd, Taipei (TW)

( * ) Notice: Subject to any disclaimer, the term of this patent is extended or adjusted under 35 U.S.C. 154(b) by 0 days.

(21) Appl. No.: 11/849,605

(22) Filed: Sep. 4, 2007

(51) Int. Cl.
*G02C 5/12* (2006.01)

(52) U.S. Cl. .......................... 351/80; 351/78; 351/136; 351/138

(58) Field of Classification Search .................... 351/78, 351/79, 80, 81, 136, 137, 138, 139, 41, 65
See application file for complete search history.

(56) References Cited

U.S. PATENT DOCUMENTS

| | | | |
|---|---|---|---|
| 5,737,055 A | * | 4/1998 | Dittmeier .................... 351/138 |
| 6,290,354 B1 | * | 9/2001 | Safran ......................... 351/57 |
| 7,314,277 B2 | * | 1/2008 | Lin et al. .................... 351/136 |
| 2006/0132705 A1 | * | 6/2006 | Li ................................ 351/90 |

* cited by examiner

*Primary Examiner*—Hung X Dang
(74) *Attorney, Agent, or Firm*—WPAT, P.C.; Anthony King

(57) ABSTRACT

The present invention discloses an eyeglass nose bridge structure having an included angle between its two nose pads that is able to fit in with any eyeglass nose bridge openings of different specifications, so that the eyeglass nose bridge structure can be used universally for lenses or glasses of different specifications. The eyeglass nose bridge structure includes a first pillar made of a soft material and a positioning portion. The positioning portion includes a positioning hole and a second pillar made of a soft material, and either ends of the first pillar are connected to a separate nose pad, and one end of the second pillar is connected in between the two ends of the first pillar. The invention can achieve the effects of lowering development and manufacturing costs and enhancing the assembling efficiency and the overall aesthetic appearance of the glasses.

10 Claims, 6 Drawing Sheets

US 7,484,843 B1

EYEGLASS NOSE BRIDGE STRUCTURE

FIELD OF THE INVENTION

The present invention relates to an eyeglass nose bridge structure, and more particularly to a structure having an included angle between two nose pads that is able to fit in with any eyeglass nose bridge openings of different specifications enabling this eyeglass nose bridge structure to be applied to lenses or glasses of different specifications.

BACKGROUND OF THE INVENTION

A pair of glasses is one of the necessary tools in our daily life. For example, farsighted and nearsighted glasses are provided for improving our eyesight, safety glasses for protecting our eyes during fitness exercises, and sunglasses for shading sunlight. In terms of glasses, an eyeglass nose bridge structure is the part in contact with a wearer's nose bridge. Refer to FIGS. 1 and 2 respectively for a perspective view of a conventional eyeglass nose bridge structure and a schematic view of assembling a conventional eyeglass nose bridge structure to the glasses. The conventional eyeglass nose bridge structure 1 is composed of a connecting portion 11 with two ends, each connected to a separate nose pad 12. The connecting portion 11 has a positioning hole 111, and each nose pad 12 has two fixing holes (not shown in the figure) at the bottom. When the conventional eyeglass nose bridge structure 1 is to be assembled to the glasses 2, a positioning pin 21 of the glasses is embedded into the positioning hole 111 of the conventional eyeglass nose bridge structure 1, and four fixing pins 22 of the glasses 2 are embedded into four fixing holes (not shown in the figure) of the conventional eyeglass nose bridge structure 1, such that the conventional eyeglass nose bridge structure 1 is fixed onto the glasses 2. However, the connecting portion 11 of the conventional eyeglass nose bridge structure 1 is substantially in a planar shape, and the included angle between the two nose pads 12 is fixed. During the time of a testing procedure as glasses 2 undergoes development or has a different specification when the eyeglass nose bridge opening 23 becomes larger or smaller, it is necessary to expand or reduce the included angle between the two nose pads 12 in order to assemble the conventional eyeglass nose bridge structure 1 to the glasses 2. Since the connecting portion 11 is in a planar shape, it will be twisted and warped if the included angle between the two nose pads 12 is changed, and the positioning pin 21 of the glasses 2 cannot be easily embedded into the positioning hole 111 of the conventional eyeglass nose bridge structure 1 when an assembling process takes place, and thus making the assembling very inconvenient. If the positioning pin 21 is forced into the positioning hole 111, the connecting portion 11 will become uneven, and the overall aesthetic appearance of the glasses 2 will be compromised.

Therefore, how to create an eyeglass nose bridge structure that can reduce its development and manufacturing costs and enhance the assembling efficiency and the overall aesthetic appearance of the glasses is the major concern of the present invention.

SUMMARY OF THE INVENTION

In view of the foregoing shortcomings of the prior art, the inventor of the present invention decided to do his utmost to improve it. Based on years of accumulated experience in the related field, he had conducted extensive researches and experiments, and finally developed an eyeglass nose bridge structure of the present invention, in the hope of lowering the development and manufacturing costs and enhancing the assembling efficiency and the overall aesthetic appearance of the glasses.

Therefore, it is the primary objective of the present invention to provide an eyeglass nose bridge structure, such that a first pillar and a second pillar, both made of a soft material, are included to construct an included angle between the two nose pads that is able to fit in with any eyeglass nose bridge openings of a different specification, and this eyeglass nose bridge structure can be used universally for lenses or glasses of different specifications, so as to lower the development and manufacturing costs, and enhance the assembling efficiency and the overall aesthetic appearance of the glasses.

To achieve the foregoing objective, the present invention provides an eyeglass nose bridge structure, comprising: a soft-materialed first pillar that connects a nose pad respectively on either ends; and a positioning portion that has a positioning hole and a soft-materialed second pillar with one of its ends connected in between the two ends of the first pillar. Therefore, the included angle between the two nose pads of the eyeglass nose bridge structure can fit in with any eyeglass nose bridge openings of a different specification, so that the eyeglass nose bridge structure can be used universally for lenses or glasses of different specifications, so as to lower the development and manufacturing costs, and enhance the assembling efficiency and the overall aesthetic appearance of the glasses.

The above and other objects, features and advantages of the present invention will become apparent from the following detailed description taken with the accompanying drawing.

DETAILED DESCRIPTION OF THE PREFERRED EMBODIMENTS

To make it easier for our examiner to understand the objective, innovative features and performance of the present invention, we use a preferred embodiment and the accompanying drawings for a detailed description of the present invention.

Figure 1:
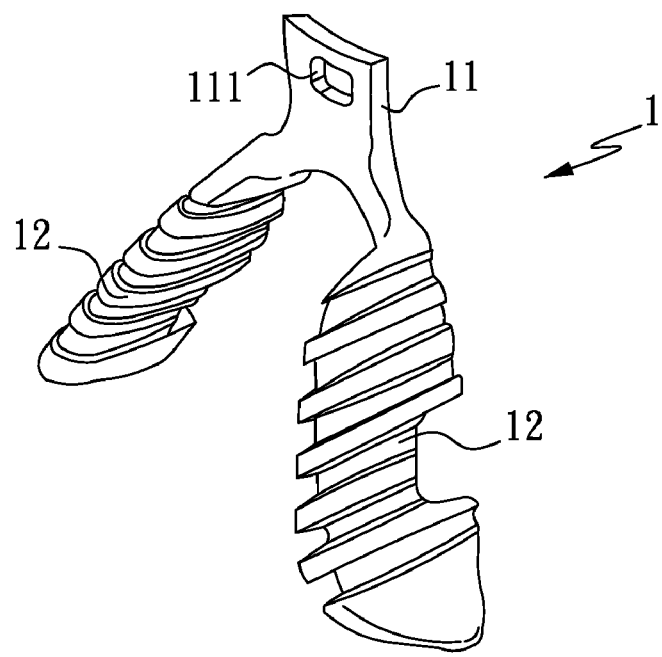
FIG. 1 is a perspective view of a prior art eyeglass nose bridge structure.
Figure 2:
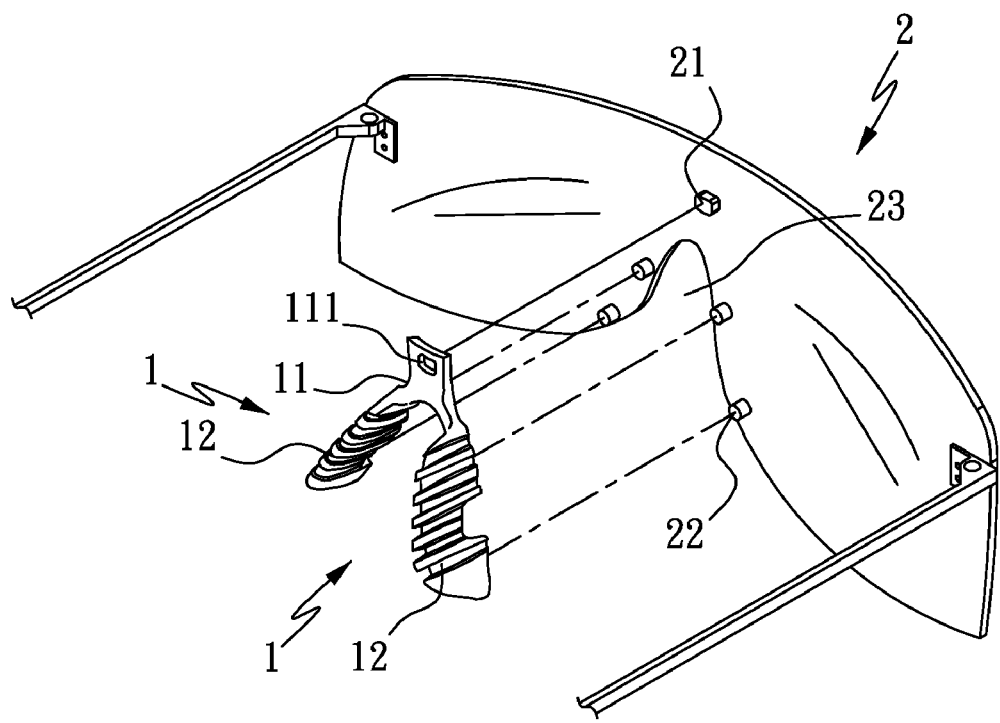
FIG. 2 is a schematic view of assembling a prior art eyeglass nose bridge structure and the glasses.
Figure 3:
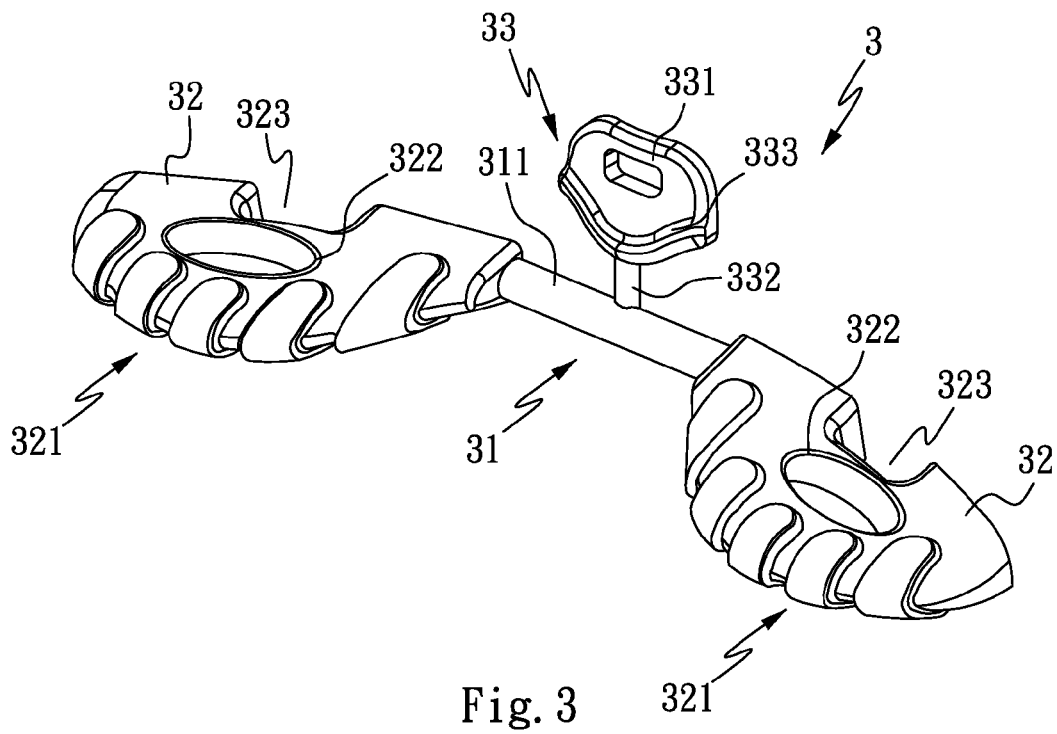
FIG. 3 is a perspective front view of a preferred embodiment of the present invention.
Figure 4:
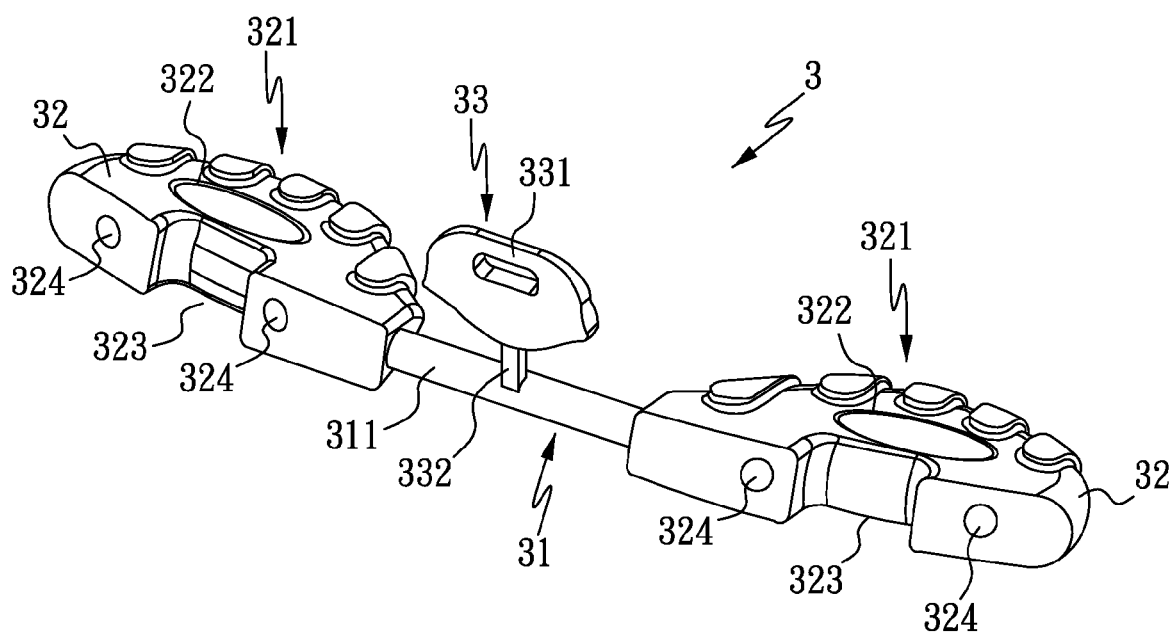
FIG. 4 is a perspective rear view of a preferred embodiment of the present invention.

Referring to FIGS. 3 and 4 respectively for a perspective front view and a perspective rear view of a preferred embodiment of the present invention, an eyeglass nose bridge structure 3 of the invention comprises: a first pillar 31 and a positioning portion 33. The first pillar 31 is made of a soft material and can be a circular cylinder or a polygonal cylinder, and either ends of the first pillar 31 are connected to a separate nose pad 32. The nose pad 32 has a lumpy portion 321, at least one penetrating hole 322 (or a concave hole), an opening 323 and at least one fixing hole 324. The lumpy portion 321 can increase the friction between a nose pad 32 and a wearer's nose bridge, so that the glasses will not fall off easily. The penetrating hole 322 allows the nose pad 32 to deform easily to improve the softness of the nose pad 32. The positioning portion 33 has a positioning hole 331, a soft-materialed second pillar 332 and a reinforced area 333 for increasing the thickness of the positioning portion 33 and enhancing its connecting force with the second pillar 332. The second pillar 332 can be a circular cylinder or a polygonal cylinder, and one end of the second pillar 332 is connected to a half pillar 311 of the first pillar 31 and disposed in between the two ends of the first pillar 31 as shown in FIGS. 3 and 4, wherein the half pillar 311 is a semicircular cylinder disposed proximate to the glasses.

Figure 5:
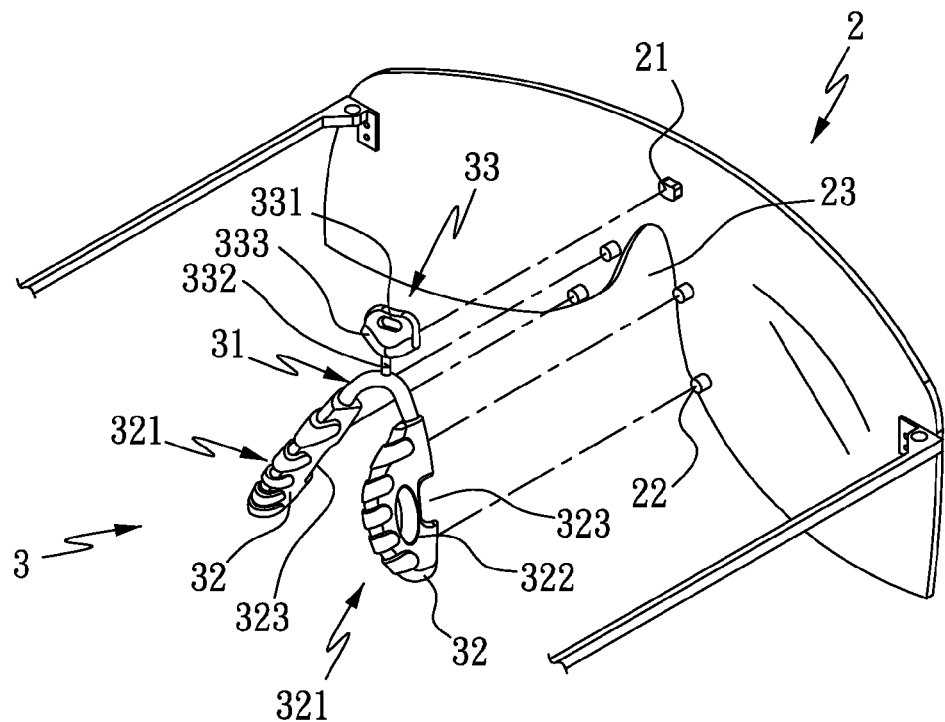
FIG. 5 is a schematic view of an assembly of a preferred embodiment of the present invention.

Referring to FIG. 5 for a schematic view of a structure of a preferred embodiment of the present invention as well as FIG. 4, when the eyeglass nose bridge structure 3 is assembled to the glasses 2 (or lens), the first pillar 31 can be bent as it is a cylindrical body made of a soft material to let the included angle between the two nose pads 32 to fit that of the eyeglass nose bridge opening 23, and the first pillar 31 will not be twisted or warped. In addition, both of the first pillar 31 and the second pillar 332 are cylindrical bodies made of a soft material, and one end of the second pillar 332 is connected in between the two ends of the first pillar 31 end by end, so that when the portion of the first pillar 31 not connected with the second pillar 332 is bent, the positioning portion 33 will not be warped or lifted from the surface of the glasses. When the eyeglass nose bridge structure 3 is installed to the glasses 2, the positioning pin 21 and the fixing pin 22 of the glasses 2 can be embedded into the positioning hole 331 and the fixing hole 324 of the eyeglass nose bridge structure 3 respectively, so that the eyeglass nose bridge structure 3 can be assembled to the glasses 2 easily, so as to enhance the assembling efficiency. Since the eyeglass nose bridge structure 3 will not be twisted or warped, the overall aesthetic appearance of the glasses 2 can be maintained after the assembling. Further, an opening 323 is disposed between the two fixing holes 324 of the nose pad 32, so that the contact area between the nose pad 32 and the lens surface becomes smaller, and the nose pad 32 can be attached onto the lens surface more properly.

Figure 6:
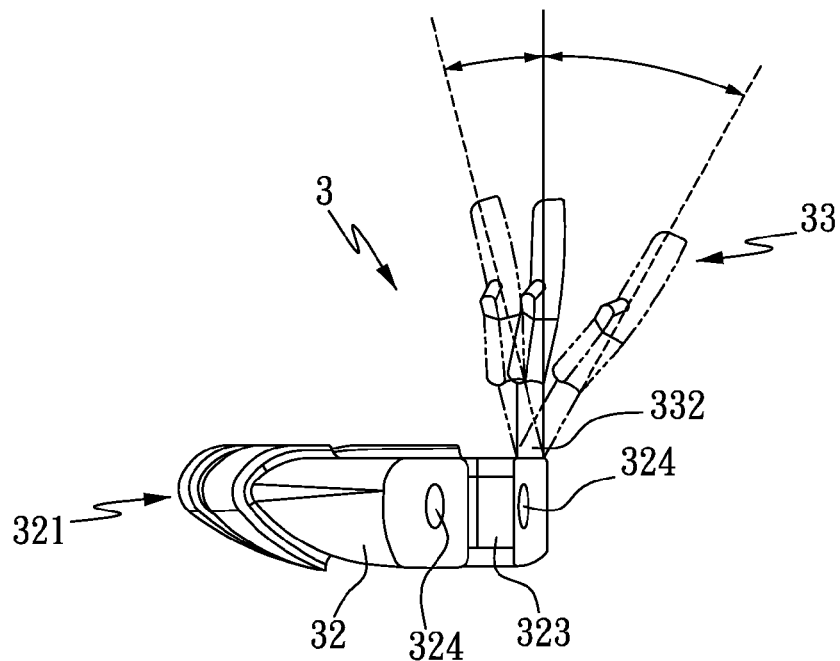
FIG. 6 is a schematic view of tilting a positioning portion in accordance with a preferred embodiment of the present invention.

Referring to FIG. 6 for a schematic view of tilting a positioning portion in accordance with a preferred embodiment of the present invention, as well as FIGS. 3 and 5, one end of the second pillar 332 of the positioning portion 33 is connected to the first pillar 31 and disposed proximate to the half pillar 311 of the glasses 2, so that when the eyeglass nose bridge structure 3 is installed to the glasses 2, the positioning portion 33 can be attached onto the lens surface much better, and the positioning pin 21 of the glasses 2 can be embedded into the positioning hole 331 of the eyeglass nose bridge structure 3 more easily, so as to enhance the assembling efficiency. In addition, after the eyeglass nose bridge structure 3 is installed to the glasses 2, if the positioning portion 33 is far away from the lens surface, the soft-materialed first pillar 31 allows the positioning portion 33 to tilt towards the lens surface, until it is attached closely onto the lens surface, so that the positioning pin 21 of the glasses 2 can be embedded into the positioning hole 331 of the eyeglass nose bridge structure 3 easily. Further, after the eyeglass nose bridge structure 3 is installed to the glasses 2, if the lens surface is pushed towards the positioning portion 33, the soft-materialed first pillar 31 allows the positioning portion 33 to tilt towards the nose bridge.

Figure 7:
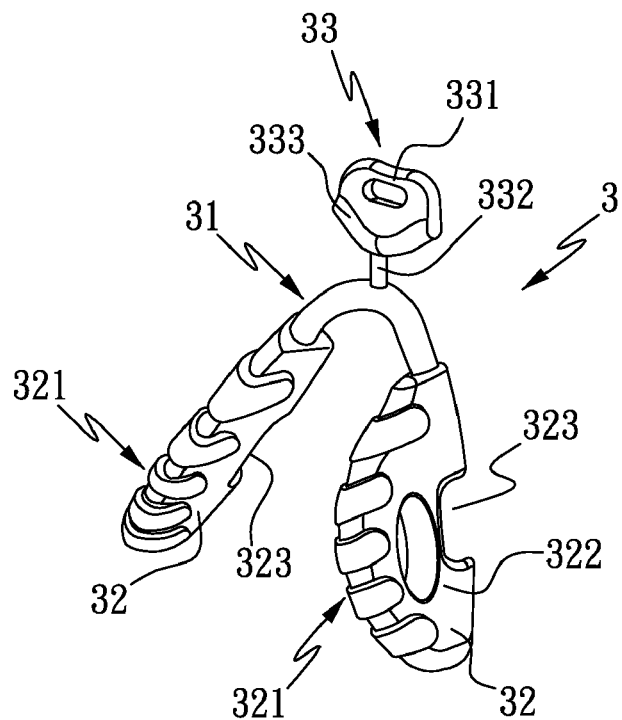
FIG. 7 is a schematic view of a curved first pillar in accordance with a preferred embodiment of the present invention.
Figure 8:
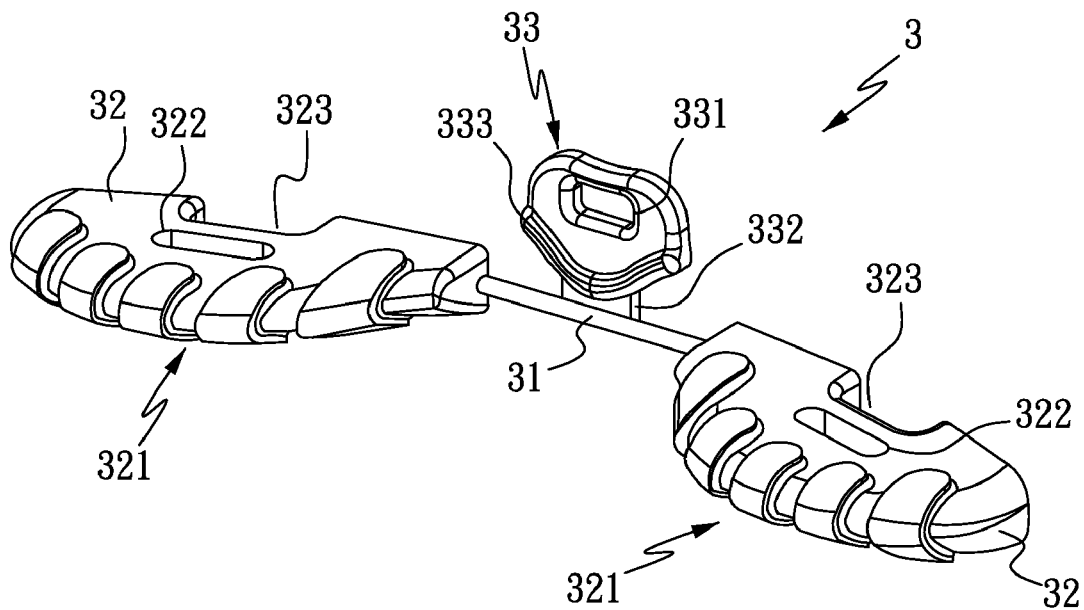
FIG. 8 is a perspective view of another preferred embodiment of the present invention.
Figure 9:
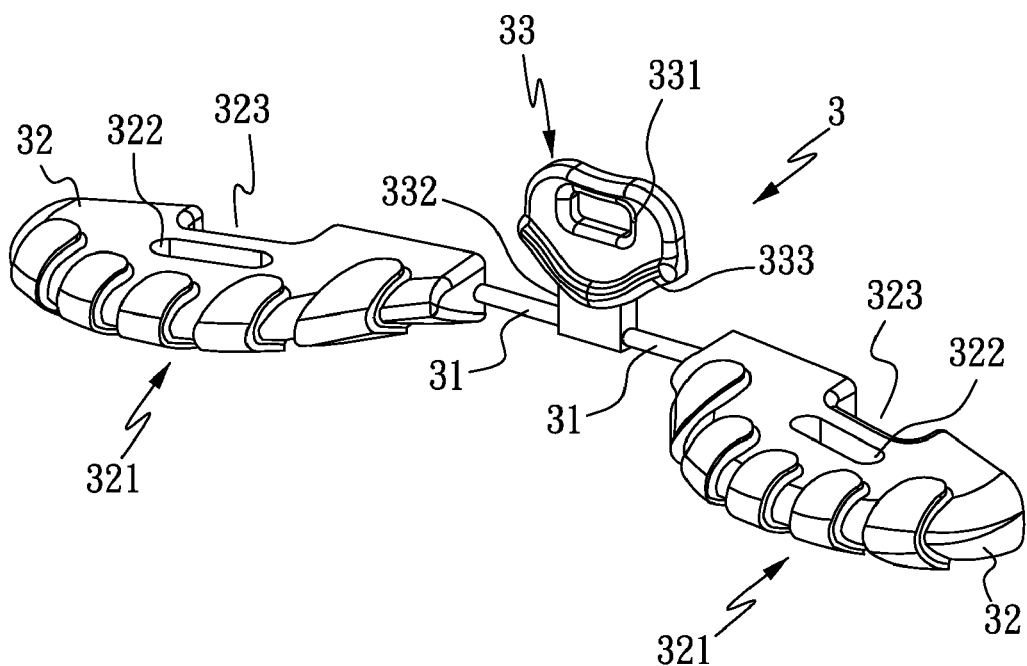
FIG. 9 is a perspective view of a further preferred embodiment of the present invention.
Figure 10:
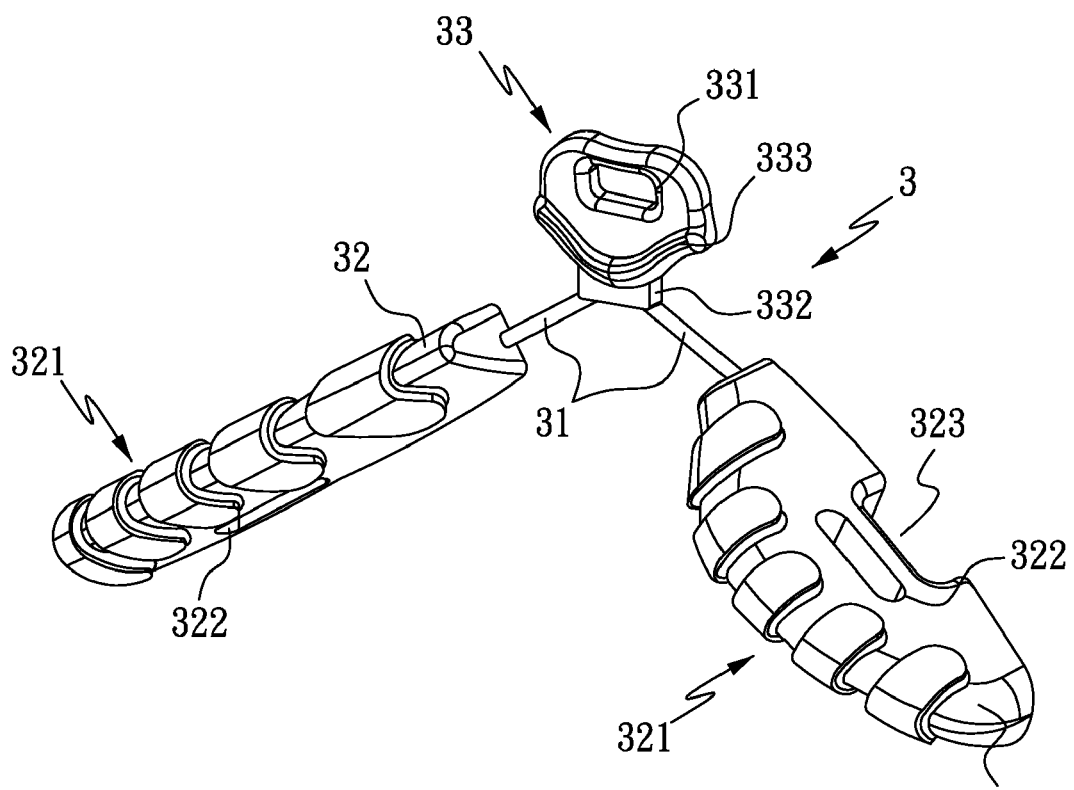
FIG. 10 is a perspective view of another further preferred embodiment of the present invention.
Figure 11:
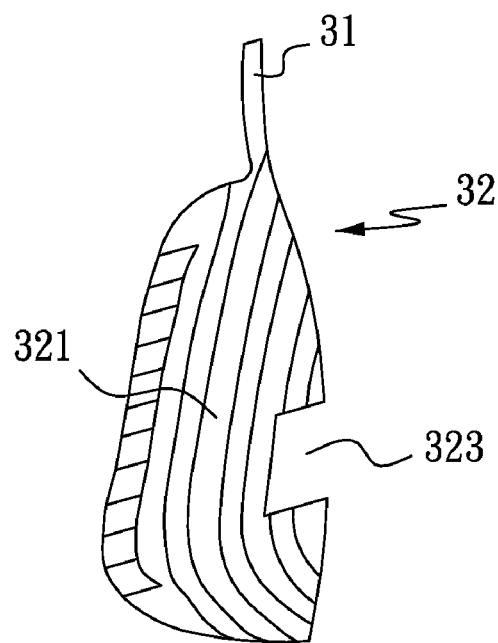
FIG. 11 is a schematic view of a lumpy portion in accordance with a preferred embodiment of the present invention.
Figure 12:
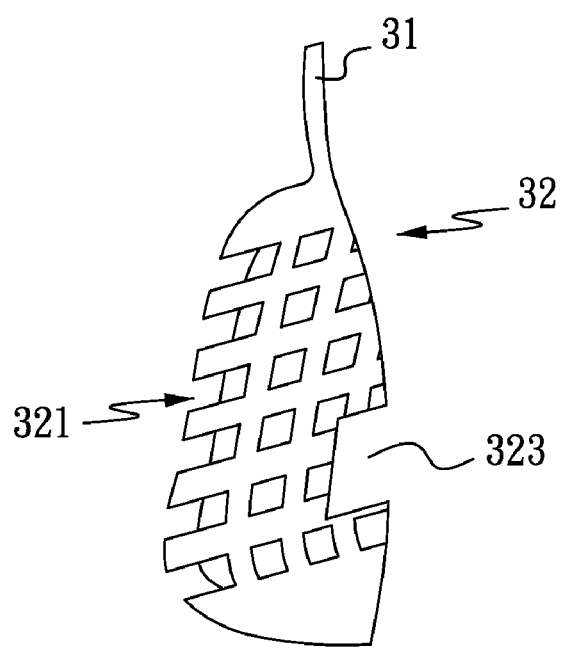
FIG. 12 is another schematic view of a lumpy portion in accordance with a preferred embodiment of the present invention.

Referring to FIG. 7 for a schematic view of a curved first pillar in accordance with a preferred embodiment of the present invention, the difference between this embodiment and the embodiment illustrated in FIG. 3 resides on that the first pillar 31 becomes an arc shape after the eyeglass nose bridge structure 3 is manufactured, so that the two nose pads 32 are close to each other. Referring to FIG. 8 for a perspective view of another preferred embodiment of the present invention, the difference between this embodiment and the embodiment illustrated in FIG. 3 resides on that the second pillar 332 is a rectangular cylinder. Referring to FIG. 9 for a perspective view of a further preferred embodiment of the present invention, the difference between this embodiment and the embodiment illustrated in FIG. 3 resides on that one end of the second pillar 332 is connected in between the two ends of the first pillar 31, and the second pillar 332 covers and wraps a portion of the first pillar 31. Referring to FIG. 10 for a perspective view of another further preferred embodiment of the present invention, the difference between this embodiment and the embodiment illustrated in FIG. 9 resides on that when one end of the second pillar 332 is connected in between the two ends of the first pillar 31, the second pillar 332 covers and wraps the first pillar 31, and the unwrapped portion of the first pillar 31 is bent downward. Referring to FIGS. 11 and 12 for schematic views of a lumpy portion in accordance with a preferred embodiment, the lumpy portion 321 of the nose pad 32 can be of other patterns.

In summation of the description above, this invention complies with the three requirements of a patent application, namely the novelty, inventive step and industrial application. In terms of the novelty and inventive step of this invention, wherein the soft-materialed first pillar and the second pillar are able to construct an included angle between the two nose pads to fit in with any eyeglass nose bridge openings of different specifications, so that the eyeglass nose bridge structure can be used universally for lenses or glasses of different specifications, so as to achieve the effects of lowering development and manufacturing costs and enhancing the assembling efficiency and the overall aesthetic appearance of the glasses. In terms of the industrial application, this invention can enhance over the prior art, and satisfy the current market requirements, and thus is duly filed for patent application.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An eyeglass nose bridge structure, comprising:
   a first pillar, made of a soft material, and having a nose pad installed separately on either ends of the first pillar; and
   a positioning portion, having a positioning hole and a second pillar made of a soft material, and one end of the second pillar being flexibly connected in between the two ends of the first pillar, wherein the positioning portion is tiltable relatively to the first pillar.

2. The eyeglass nose bridge structure of claim 1, wherein the first pillar is a circular cylinder or a right polygonal cylinder.

3. The eyeglass nose bridge structure of claim 1, wherein the second pillar is a circular cylinder, a rectangular cylinder or a right polygonal cylinder.

4. The eyeglass nose bridge structure of claim 1, wherein the first pillar is in an arc shape for keeping the two nose pads close with each other.

5. The eyeglass nose bridge structure of claim 1, wherein the second pillar has one end connected in between the two ends of the first pillar, and the second pillar wraps a portion of the first pillar.

6. The eyeglass nose bridge structure of claim 1, wherein the second pillar has one end connected to a half pillar of the first pillar, and the half pillar is proximate to glasses.

7. The eyeglass nose bridge structure of claim 1, wherein the positioning portion has a reinforced area for enhancing a connecting force with the second pillar.

8. The eyeglass nose bridge structure of claim 1, wherein the nose pad includes a lumpy portion for increasing the friction between the nose pad and a nose bridge.

9. The eyeglass nose bridge structure of claim 1, wherein the nose pad has at least one penetrating hole or a concave hole for increasing the softness of the nose pad.

10. The eyeglass nose bridge structure of claim 1, wherein the nose pad includes at least one fixing hole for installing the nose pad to a pair of glasses.

* * * * *